UNITED STATES PATENT OFFICE.

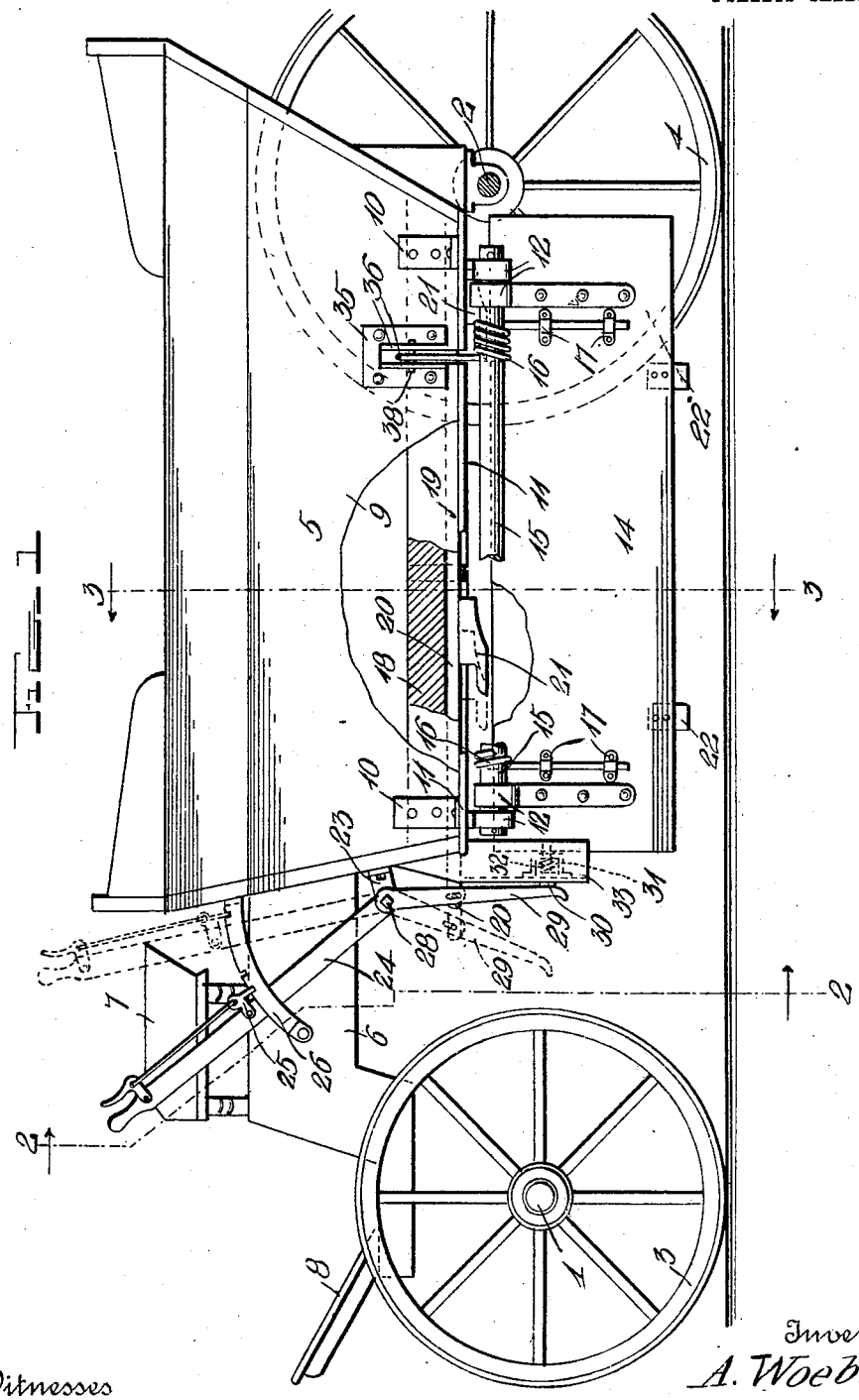

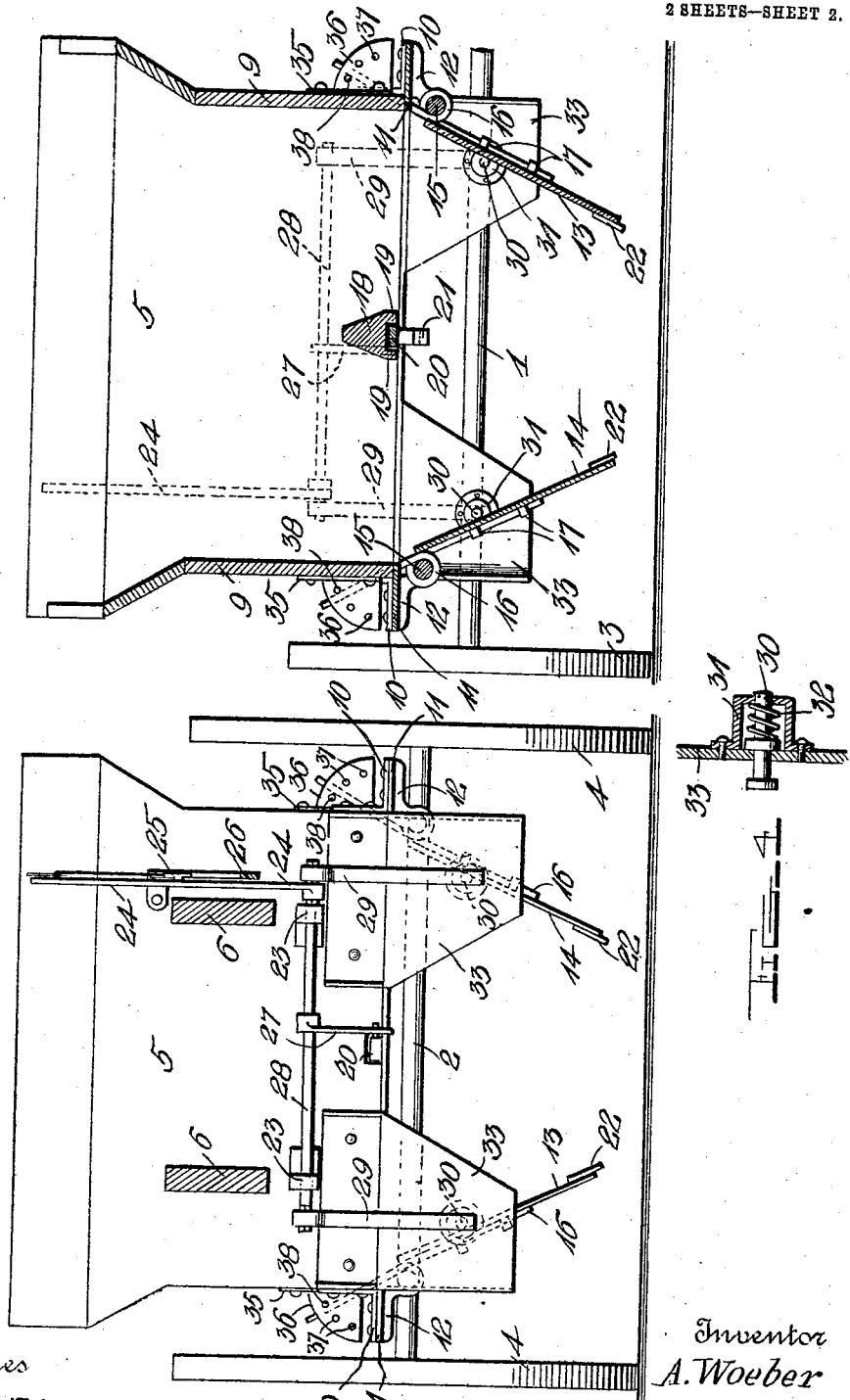

ADAM WOEBER, OF DENVER, COLORADO.

DUMP-WAGON.

969,082.  Specification of Letters Patent.  Patented Aug. 30, 1910.

Application filed April 22, 1909. Serial No. 491,555.

*To all whom it may concern:*

Be it known that I, ADAM WOEBER, a citizen of the United States, residing at Denver, in the county of Denver and State of Colorado, have invented certain new and useful Improvements in Dump-Wagons; and I do declare the following to be a full, clear, and exact description of the invention, such as will enable others skilled in the art to which it appertains to make and use the same.

This invention relates to wagons and particularly to that type that employ dumping bottoms.

The object of the invention is to provide a wagon of this character which will have a hinged bottom adapted to be displaced by the weight of the load so as to dump the contents of the wagon and which will be automatically returned to normal position.

A further object of the invention is the provision of means operating when releasing and dumping the wagon to lock the doors in dumping position, so that they will not interfere with the removal of the wagon from a discharged load.

A still further object of the invention is the provision of novel means for locking the door when in load receiving position and means for releasing the locking means and acting to subsequently lock the bottom in dumping position.

With the foregoing and other objects in view, the invention consists of certain novel features of construction, combination and arrangement of parts, as will be more fully described and particularly pointed out in the appended claims.

In the accompanying drawings, Figure 1 is a side elevation with parts broken away, and showing one of the bottom members in locked position for dumping. Fig. 2 is a transverse section on the line 2—2 of Fig. 1; Fig. 3 is a detail sectional view on the line 3—3 of Fig. 1; Fig. 4 is a detail sectional view of the locking pin.

Referring more especially to the drawings, 1 and 2, represent the front and rear axles of a vehicle which carry as usual the wheels, 3 and 4, and support the wagon body, 5. This body is shown herein as having a forwardly extending seat support, 6, carrying the usual driver's seat, 7, and having a foot board, 8, which is supported over the front axle, 1. The sides of the vehicle are shown at 9, and have extending therefrom the angular braces, 10, which support the lateral extensions, 11, connected to the sides so as to carry the heavy hinges, 12, which support the bottom members, 13 and 14. The hinges, 12, are arranged adjacent the forward and rear ends of the body and are connected together by an axle or pivot rod, 15, which is provided at its ends with cotter keys or pins to prevent displacement. Surrounding these shafts or rods adjacent the hinges are spirally wound springs 16, having one of their ends connected to the bottom members, 13 and 14, by clips, 17, and their opposite ends connected as will be hereinafter described.

In order to increase or decrease the tension of the springs, 16, or to keep their tension down to a prescribed pressure there are secured to the sides of the body, plates 35 which have projecting from their sides the spaced segmental plates, 36, having a series of apertures, 37, which are adapted to be engaged by a pin, 38. The ends of the springs, 16, which are not connected to the bottom members are passed in between the plates, 36, and may be adjusted by forcing the same downwardly and placing the pins, 38, thereover. By this means the tension of the spring may be always kept normal or may be adjusted to a higher or lower degree as may be found desirable.

Extending longitudinally of the body in the center thereof is a supporting girder, 18, upon the bottom of which is a pair of guiding ways, 19, in which the locking bar, 20, is adapted to travel. This bar carries adjacent the forward and rear ends of the body, a pair of locking lugs, 21, which engage the bars, 22, carried by the bottom members, 13 and 14.

Journaled in lugs 23 upon the front end of the wagon, is a transverse shaft 28 to which is secured an operating lever 24 which extends up adjacent the driver's seat and is provided with the usual spring locking pawl 25 adapted to engage the notches in the adjusting segment 26. Centrally keyed to this shaft, is a suitable arm 27 which is in turn pivoted to the locking rod 20, so that, when the lever is operated forwardly, the locking rod 20 is disengaged from the bottom members.

Adjacent the ends of the shaft, 28, I provide downwardly extending arms, 29, adapted to engage the locking pins, 30, so as to force the same inwardly to prevent the return of the bottom members, 13 and 14, until such return is desirable. These locking pins are mounted in the casings, 31, and are normally pressed outwardly by the spiral springs, 32. The casings, 31, are mounted upon downwardly projecting extensions 33, arranged on either side of the wagon body.

When the wagon is loaded and it is desired to release the load therein, the lever 24 is moved forwardly over the segment, 26, until the pawl, 25, engages the forward notch. The locking catches, 21, are then released from the bars, 22 on the bottom members, 13 and 14, and these latter members then drop by reason of the weight of the load to the position shown in Fig. 2. Upon further movement of the lever, the arms, 29, engage the locking pins, 30, and press the same rearwardly so that they lie in the path of the bottom members, 13 and 14, and prevent them from returning to normal position under the influence of the springs. After the driver has moved the wagon beyond the load and the bottom members, 13 and 14, are free thereof, the lever is reversed or turned rearwardly until the pawl, 25, engages the intermediate notch when the pins, 30, will be released. The springs, 16, will now return the bottom members, 13 and 14, to horizontal position whereby upon further rearward movement of the lever, 24, the locking lugs, 21, are engaged with the bars, 22, and the members locked in position to receive another load.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. In a wagon of the character described, a body, a bottom member hinged thereto, means for locking said member in supporting position, means for operating said locking means to engage and release the same from said member, and means operated by said operating means in the release movement thereof to lock the member in dumping position.

2. In a wagon of the character described, a body, a bottom member hinged thereto, means for locking said member in supporting position, a lever for operating said locking means to engage and release the same from said member, and means operated by said lever in the release movement thereof to lock the member in dumping position.

3. In a wagon of the class described, a body, a bottom member hinged thereto, means for locking said member in supporting position, a lever for operating said locking means to engage and release the same from said member, and a spring retracted bolt operated by said lever in the release movement thereof to lock the member in dumping position.

4. In a device of the class described, a body, bottom members hinged thereto, resilient means for normally holding said bottom members in supporting position, means for locking said members in supporting position, means for operating said locking means to engage and release the same from said members, means operated by said operating means in the release movement thereof to lock the members in dumping position, and means to throw said last mentioned locking means automatically to inoperative position upon its release, whereby the bottom members will be automatically returned to supporting position.

5. In a wagon of the character described, a body, a pair of bottom members hinged thereto, means normally acting to hold the bottom members in supporting position, a sliding locking rod for securing the bottom members in supporting position, a lever for operating said locking rod, and means controlled by the lever to lock the bottom members in dumping position.

In testimony whereof I have hereunto set my hand in presence of two subscribing witnesses.

ADAM WOEBER.

Witnesses:
SIDNEY EARL BENNETT,
ARTHUR PEARSON.